UNITED STATES PATENT OFFICE.

WILLIAM WHEELER HUBBELL, OF PHILADELPHIA, PENNSYLVANIA.

IMPROVEMENT IN PAVEMENTS.

Specification forming part of Letters Patent No. 158,415, dated January 5, 1875; application filed December 19, 1874.

*To all whom it may concern:*

Be it known that I, WILLIAM WHEELER HUBBELL, of the city of Philadelphia and State of Pennsylvania, have invented a new and useful Improvement in Street-Pavement, of which the following is a specification:

My present invention is an improvement upon the street-pavement, for which Letters Patent No. 115,475, dated May 30, 1871, were granted to me; and the nature of this invention is a process which consists in saturating the cement which forms the wearing-surface of the pavement with a thin body or solution of hot pitch or bitumen, so as to more firmly unite the particles of the cement, and prevent more effectively the formation of dust from the concussion of horses' feet and action of the wheels of vehicles which tend to pulverize and wear it.

A drawing to illustrate this invention or improvement would be the same in appearance as that annexed to my said patent, and, therefore, I refer to the said drawing as illustrating the nature of the pavement on which this improvement is made.

The pavement substantially consists of broken stone laid upon gravel or earth for a foundation, and bound together by cement, and coal-ashes or sand between the interstices of the stone, binding them together and forming a wearing-surface immediately above the surface of the broken stone.

This cement is composed chiefly of Rosendale or hydraulic cement, and to harden it most effectively is saturated with a solution of lime, though the lime, which is of itself one kind of cement, may be omitted, but the hydraulic cement should in all cases be used to form the wearing-surface. There are various brands of hydraulic cement, and I do not confine my invention to any one exclusively. The Rosendale or other suitable and economical cement should be used.

When the cement has been spread and well set, I slush or saturate its surface with thin hot bitumen or pitch, and dust the surface of bitumen over with dry cement, and roll and sweep it on the surface to adhere to the bitumen, and thus more effectively hold the particles of the cement together, and prevent them, as far as practicable, from forming dust.

I am well aware that bitumen has been used with gravel to form a composition for pavements, and cement mixed together and laid in a layer, in which combination and process the bitumen predominates, and softens in hot weather; but this does not present the hardening principle of the cement when first set in the pavement, and afterward saturated with hot bitumen or tar by absorption, as in my combination and process.

My object in this invention is to combine the adhesive and hardening principle of the bitumen with the hardening principle of the hydraulic cement, to prevent the cement from forming or wearing into dust as much as possible; and, also, while using the bitumen, its quantity is so small in the cement as not to soften by the heat of summer, as the bitumen pavements now do.

I do not claim combining or mixing broken stone, gravel, boiling tar, and hydraulic cement to lay and form a composition for a pavement, in which mixture the bitumen predominates.

I claim as my invention—

The improved process of making the surface of my pavement, consisting of combining or slushing and saturating the cement-surface with hot bitumen or tar by absorption, after the hydraulic cement is laid or set, substantially as described.

WM. WHEELER HUBBELL.

Witnesses:
T. C. SMITH,
HARRY COLEMAN.